(12) United States Patent
Mordechai et al.

(10) Patent No.: US 11,127,147 B2
(45) Date of Patent: Sep. 21, 2021

(54) THREE-DIMENSIONAL POINT CLOUD GENERATION USING A POLARIMETRIC CAMERA IN A DRIVE ASSISTANCE SYSTEM EQUIPPED VEHICLE

(71) Applicant: GM GLOBAL TECHNOLOGY OPERATIONS LLC, Detroit, MI (US)

(72) Inventors: Emanuel Mordechai, Mishmarot (IL); Dan Levi, Kyriat Ono (IL); Eran Kishon, Hod Hasharon (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 116 days.

(21) Appl. No.: 16/708,690

(22) Filed: Dec. 10, 2019

(65) Prior Publication Data

US 2021/0174528 A1 Jun. 10, 2021

(51) Int. Cl.
| | |
|---|---|
| *G06K 9/00* | (2006.01) |
| *G06T 7/593* | (2017.01) |
| *G01S 17/894* | (2020.01) |
| *G01S 17/90* | (2020.01) |
| *G01S 13/90* | (2006.01) |
| *G05D 1/02* | (2020.01) |
| *G05D 1/00* | (2006.01) |

(52) U.S. Cl.
CPC .......... *G06T 7/593* (2017.01); *G01S 13/9076* (2019.05); *G01S 17/894* (2020.01); *G01S 17/90* (2020.01); *G05D 1/0094* (2013.01); *G05D 1/0221* (2013.01); *G05D 1/0246* (2013.01); *G06T 2207/10024* (2013.01); *G06T 2207/10028* (2013.01); *G06T 2207/20084* (2013.01)

(58) Field of Classification Search
CPC .......... G06T 7/593; G06T 2207/20084; G06T 2207/10028; G06T 2207/10024; G01S 17/894; G01S 17/90; G01S 13/9076; G01S 17/89; G01S 7/86; G05D 1/0246; G05D 1/0094; G05D 1/0221; G05D 2201/0213; G05D 1/0088
USPC ........................................................ 382/154
See application file for complete search history.

(56) References Cited

U.S. PATENT DOCUMENTS

| | | | |
|---|---|---|---|
| 8,149,268 B1 * | 4/2012 | Meyers ................ | H04N 13/261 348/42 |
| 9,041,915 B2 * | 5/2015 | Earhart ................. | G01S 17/933 356/4.01 |
| 10,328,769 B2 * | 6/2019 | Ferguson .................. | A23L 5/00 |
| 10,641,897 B1 * | 5/2020 | Dussan .................... | G01S 7/497 |
| 10,937,186 B2 * | 3/2021 | Wang .................... | G06K 9/6257 |

(Continued)

FOREIGN PATENT DOCUMENTS

CA        2902675 A1 *  2/2016 ............ H04N 5/332

*Primary Examiner* — Mahendra R Patel
(74) *Attorney, Agent, or Firm* — Lorenz & Kopf LLP

(57) ABSTRACT

The present application relates to a method and apparatus for generating a three-dimensional point cloud generation using a polarimetric camera in a drive assistance system equipped vehicle including a camera configured to capture a color image for a field of view and a polarimetric data of the field of view, a processor configured to perform a neural network function in response to the color image and the polarimetric data to generate a depth map of the field of view, and a vehicle controller configured a perform an advanced driving assistance function and to control a vehicle movement in response to the depth map.

15 Claims, 4 Drawing Sheets

(56) References Cited

U.S. PATENT DOCUMENTS

| | | | |
|---|---|---|---|
| 2008/0027591 A1* | 1/2008 | Lenser | G05D 1/0251 |
| | | | 701/2 |
| 2014/0062764 A1* | 3/2014 | Reis | G01S 13/9023 |
| | | | 342/25 C |
| 2016/0065938 A1* | 3/2016 | Kazemzadeh | H04N 13/232 |
| | | | 348/46 |
| 2017/0307751 A1* | 10/2017 | Rohani | G01S 17/89 |
| 2018/0100731 A1* | 4/2018 | Pau | H04N 9/04555 |
| 2018/0232947 A1* | 8/2018 | Nehmadi | G01S 17/931 |
| 2019/0018143 A1* | 1/2019 | Thayer | G01S 17/89 |
| 2019/0128998 A1* | 5/2019 | Josefsberg | H03L 7/091 |
| 2019/0258251 A1* | 8/2019 | Ditty | G06K 9/00805 |
| 2019/0291720 A1* | 9/2019 | Xiao | G08G 1/0112 |
| 2020/0007844 A1* | 1/2020 | Seo | G06T 7/55 |
| 2020/0116558 A1* | 4/2020 | Pacala | G01S 7/4816 |
| 2020/0116836 A1* | 4/2020 | Pacala | G01J 3/0229 |
| 2020/0182988 A1* | 6/2020 | Pau | G01S 7/4815 |
| 2021/0097858 A1* | 4/2021 | Moretti | B62D 15/029 |

\* cited by examiner

THREE-DIMENSIONAL POINT CLOUD GENERATION USING A POLARIMETRIC CAMERA IN A DRIVE ASSISTANCE SYSTEM EQUIPPED VEHICLE

BACKGROUND

The present disclosure relates generally to programming motor vehicle control systems. More specifically, aspects of this disclosure relate to systems, methods and devices for combining conventional RGB images with polarization data from a polarimetric camera using a deep neural network to generate a three-dimensional point cloud for use by a drive assistance system equipped vehicle.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various advanced driver-assistance systems (ADAS), such as cruise control, adaptive cruise control, and parking assistance systems correspond to lower automation levels, while true "driverless" vehicles correspond to higher automation levels.

ADAS typically use sensors such as LiDAR, radar and cameras to detect and map the area surrounding the host vehicle. LiDARs have limited spatial resolution and require using active illumination of the field of view by a laser to allow time of flight (ToF) measurements. In addition, state-of-the-art LiDARs have productization challenges due to high costs, bulky mechanical build, mechanical scanning mechanisms and other moving parts. It would be desirable to overcome these problems to provide a method and apparatus for an ADAS system to detect and present three-dimensional point cloud for use by an ADAS equipped motor vehicle.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems.

In accordance with an aspect of the present invention, an apparatus is provided including a camera configured to capture a color image for a field of view and a polarimetric data of the field of view, a processor configured to perform a neural network function in response to the color image and the polarimetric data to generate a depth map of the field of view, and a vehicle controller configured a perform an advanced driving assistance function and to control a vehicle movement in response to the depth map.

In accordance with another aspect of the present invention wherein the color image includes a monochromatic green image of the field of view, a monochromatic red image of the field of view and a monochromatic blue image of the field of view.

In accordance with another aspect of the present invention wherein the polarimetric data is generated in response to four 4×4 basic calculation units to form a 16 pixels calculation unit.

In accordance with another aspect of the present invention wherein the camera includes a polarizer array layer implemented on top of a common color filter array.

In accordance with another aspect of the present invention wherein the polarimetric data is generated in response to a polarizer array layer.

In accordance with another aspect of the present invention wherein the color image includes RGB light color information.

In accordance with another aspect of the present invention wherein the polarization data includes angle of linear polarization and degree of linear polarization for an image of the field of view.

In accordance with another aspect of the present invention including a memory configured to receive the depth map from the processor and to store the depth map.

In accordance with another aspect of the present invention a method performed by a processor including receiving a color image of a field of view from a camera, receiving a polarimetric data of the field of view from a polarimetric camera, performing a neural network function to generate a depth map of the field of view in response to the color image and the polarimetric data, and performing a vehicle control operation to control a vehicle in response to the depth map.

In accordance with another aspect of the present invention including generating an angle of linear polarization and degree of linear polarization for an image of the field of view.

In accordance with another aspect of the present invention including receiving a lidar depth cloud of the field of view from a lidar and comparing the depth map to the lidar depth cloud to reaffirm the depth map.

In accordance with another aspect of the present invention including controlling a steering of a host vehicle in response to the vehicle control operation.

In accordance with another aspect of the present invention wherein the depth map is used by a vehicle controller to perform an assisted driving algorithm.

In accordance with another aspect of the present invention wherein the color image and the polarimetric data are captured by a camera having a polarizer array layer and a common color filter array.

In accordance with another aspect of the present invention wherein the color image includes a monochromatic green image of the field of view, a monochromatic red image of the field of view and a monochromatic blue image of the field of view.

In accordance with another aspect of the present invention operative to generate a 16 pixels calculation unit in response to a four pixel blue calculation unit, a four pixel red calculation unit and a four pixel green calculation unit and at least one polarization value for each of the four pixel blue calculation unit, the four pixel red calculation unit and the four pixel green calculation unit.

In accordance with another aspect of the present invention including generating a polarization plus color frame in response to the polarimetric data and the color image of the field of view and wherein the neural network function is performed on the polarization plus color frame.

In accordance with another aspect of the present invention wherein the color image includes RGB light color information.

In accordance with another aspect of the present invention, a method for performing an assisted driving operation including receiving a first polarimetric data of a first field of view, receiving a first color image of the first field of view, receiving a lidar depth point cloud of the first field of view, training a neural network function in response to the first polarimetric data, the first color image, and the lidar depth point cloud, receiving a second color image of a second field of view and a second polarimetric data of the second field of view, performing the neural network function to generate a depth map of the second field of view in response to the second color image and the second polarimetric data, and performing the assisted driving operation in response to the depth map to control a vehicle.

In accordance with another aspect of the present invention wherein the second color image and the second polarimetric data are captured by a camera having a polarizer array layer and a common color filter array.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the system and method will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
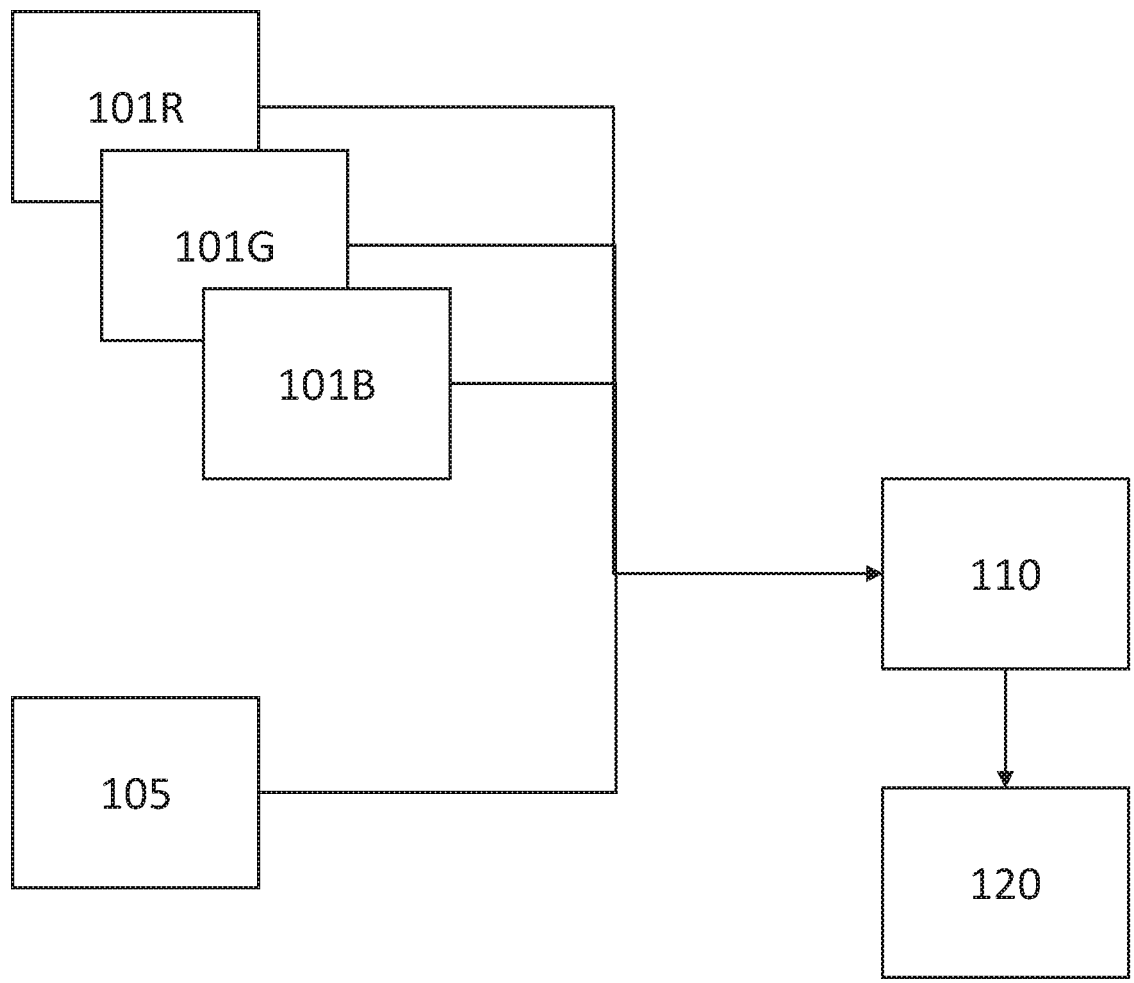
FIG. 1 shows an dataflow overview for three-dimensional point cloud generation using a polarimetric camera in a drive assistance system equipped vehicle according to an exemplary embodiment.

FIG. 1 schematically illustrates an operating overview 100 for three-dimensional point cloud generation using a polarimetric camera in a drive assistance system equipped vehicle. In this exemplary embodiment, a system and method are disclosed to utilize a series of conventional light color information images, wherein each image may include red image data 101R, green image data 101G and blue image data 101B. This conventional light color information is combined with polarization raw data 105 using a deep neural network 110 to generate a point cloud image 120. The point cloud image may include distances, determined at periodic azimuth and elevation increments, from the sensor to objects within the image The polarization raw data 105 may be captured by a passive polarimetric camera to achieve a high resolution, depth image of the scene, which may not require active illumination and time-of-flight measurement. The exemplary system may be configured for combining polarimetric imaging with machine learning for depth estimation and may use additional sensors for self-supervised training of the depth machine learning model. Further enhancement of the depth estimation may be made by learning directly from the raw sensor measurement.

A polarimetric imaging camera may provide light polarization states in addition to the conventional light color (RGB). The light polarization state may be processed to ascertain some information of the imaged surfaces orientations. The presently disclosed system and methodology is configured to generate real-time video of dense 3D point clouds using a polarization camera without using an active illumination. The 3D point cloud may be generated using a deep neural network in real-time. The neural network may receive high-resolution polarization+RGB frames and may output a 'RGB+depth point cloud. In an additional embodiment, a neural network may be trained in a fully automated process using a ground truth training apparatus comprised of the polarimetric imaging camera aligned with high resolution depth imager such as a dense LiDAR, stereoscopic camera, structured light depth imager, or any other adequate sensor.

Figure 2A:
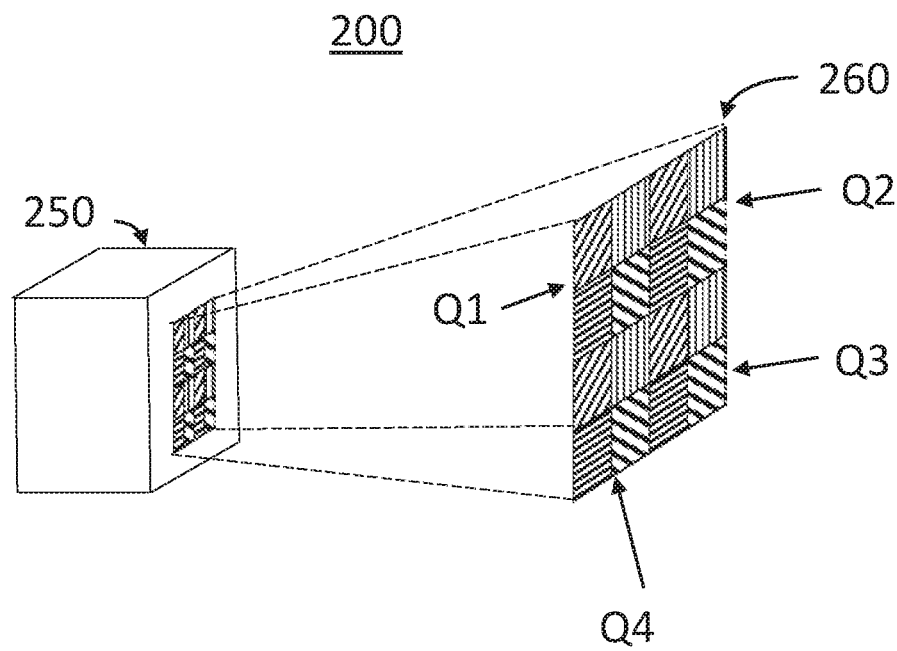
FIG. 2a shows a block diagram illustrating an exemplary implementation of a system for a three-dimensional point cloud generation using a polarimetric camera.

Turning now to FIG. 2a, a diagram illustrating an exemplary implementation of a system 200 for a three-dimensional point cloud generation using a polarimetric camera 250 is shown. The system may include a polarimetric camera 250 having a polarizer array layer 260 made of nanowire-grid pattern placed on the focal-plane-array (FPA) above the photodiodes. The polarizer array layer 260 could be inherently implemented as part of the sensor fabrication process. Alternatively, the polarizer array layer 260 could be designed and manufactured and then applied to the FPA.

In order to measure light color intensity (i.e., red green blue (RGB) data) as well as polarimetric data, the polarizer array layer 260 may be implemented on top of a common color filter array (CFA) known as RGGB, RG1G2B, or Bayer filter. In an exemplary embodiment, a 4×4 basic calculation unit is used to form a 16 pixels calculation unit. The 4×4 basic calculation unit may be comprised of four 2×2 different angled polarizers Q1, Q2, Q3 and Q4 wherein each of the 2×2 different angled polarizers Q1, Q2, Q3 and Q4 is implemented over one of the RGGB portions of the common color filter array.

Figure 2B:
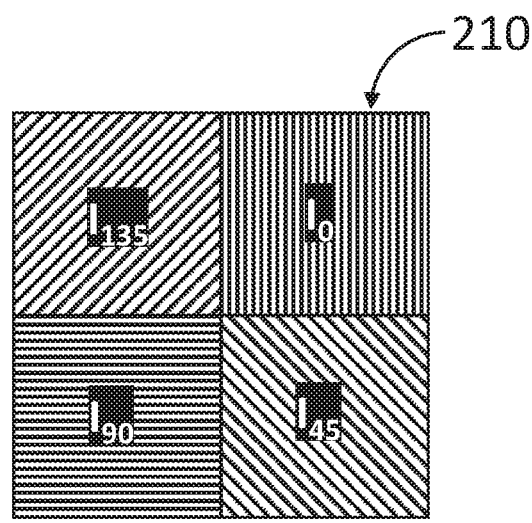
FIG. 2b shows an exemplary polarizer array layer quadrant for generating a three-dimensional point cloud using a polarimetric camera.

Turning to FIG. 2b, an exemplary polarizer array layer quadrant 210 is shown comprising four different angled polarizers as follows: 0° ($I_0$), 45° ($I_{45}$), 90° ($I_{90}$) and 135° ($I_{135}$). In this example, every 2×2 block makes up a four pixels calculation unit allowing measurement of three Stokes parameters (denoted S0, S1, S2) as well as measurement of Angle of Linear Polarization (AoLP) and Degree of Linear Polarization (DoLP). In this example, the polarization data is calculated independently for each color of the 4 colors of the CFA and the camera output is a scene image with 5 channels: RGB, AoLP, and DoLP. Thus the raw data received from each of the angled polarizers, $I_0$, $I_{45}$, $I_{90}$, and $I_{135}$ are used to determine the Stokes parameters S0, S1, S2 according to equation set 1.

$$S_0 = i_0 + i_{90} = i_{45} + i_{135}$$

$$S_1 = i_0 - i_{90}$$

$$S_2 = i_{45} - i_{135} \qquad \text{Equation 1}$$

In turn, the stokes parameters are used to generate a camera output of a field of view image with 3 channels: Intensity, AoLP, and DoLP according to equations 2 and 3.

$$DoLP = 2 \cdot \sqrt{(S_1^2 + S_2^2)}/(S_0) \in [0,1] \qquad \text{Equation 2}$$

$$AoLP = 0.5 \cdot a \tan(S_2/S_1) \in [0° \ldots 180°] \qquad \text{Equation 3}$$

Figure 3:
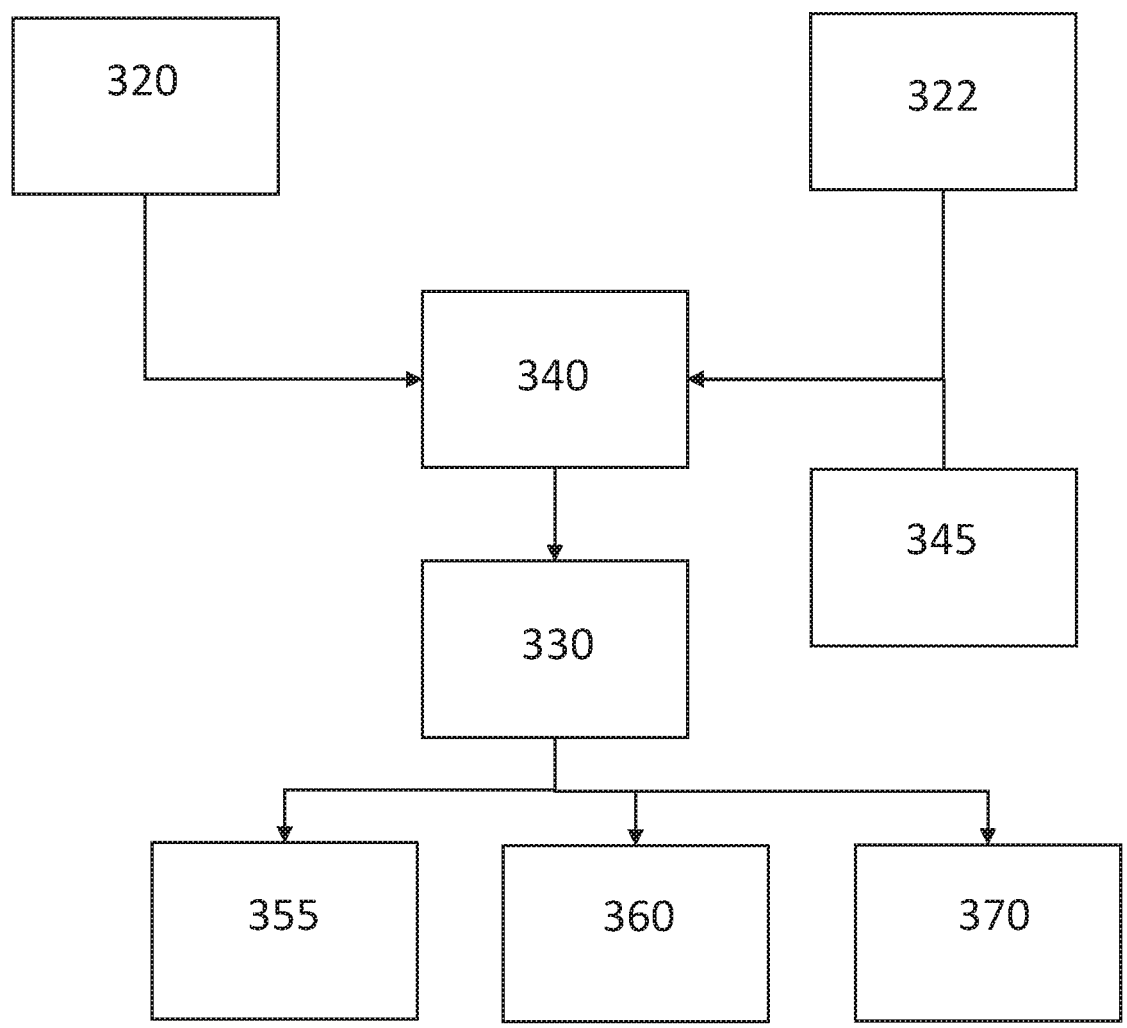
FIG. 3 shows a block diagram illustrating a system for three-dimensional point cloud generation using a polarimetric camera in a drive assistance system equipped vehicle according to an exemplary embodiment.

Turning now to FIG. 3, a block diagram illustrating an exemplary implementation of a system 300 for off road route selection and presentation in a drive assistance system equipped vehicle is shown. The system 300 may include a processor 340, a polarimetric camera 320, a lidar 322, a memory 345, a vehicle controller 330 a throttle controller 355, a brake controller 360 and a steering controller 370.

The system is operative to use various sensors such as a polarimetric camera 320, and lidar 322 capable of detecting and mapping various external surfaces, objects and obstacles. Sensor fusion algorithms may be used to provide accurate detection and tracking of external objects as well as calculation of appropriate attributes such as relative velocities, accelerations, and the like. The camera 320 is operative to capture an image of a field of view (FOV) which may include static and dynamic objects proximate to the vehicle. Image processing techniques may be used to identify and locate objects within the FOV. These objects may then be bounded and identified as an undesirable driving area and stored in a memory or added to a reference map for the ADAS.

The polarimetric camera 320 may be operative to capture an image, or a series of images of a field of view proximate to an ADAS equipped vehicle. The series of images may be used to generate a video or the like of the field of view over time. The polarimetric camera 320 may be operative to passively collected polarimetric data and may be equipped with a polarization array layer over a common color filter array. In an exemplary embodiment, the polarimetric camera 320 may be operative to collect polarization data for each of four colors of the common color filter array. Thus, in this exemplary embodiment, the polarimetric camera 320 may collect 16 different polarization pixel values per image to form a 4×4 16 pixel calculation unit. In this exemplary embodiment, the polarimetric camera 320 may collect a zero degree, 45 degree, 90 degree and 135 degree value for each of the four colors.

The lidar 322 may be employed as a sensor on the host vehicle to detect surfaces and objects around the vehicle and provide a range to and orientation of those objects using reflections from the objects providing multiple scan points that combine as a point cluster range map, where a separate scan point is provided for every ½° or less across the field-of-view (FOV) of the sensor. Therefore, if a target vehicle or other object is detected in front of the subject vehicle, there may be multiple scan points that are returned that may be used to determine the distance of the target vehicle from the subject vehicle. By providing a cluster of scan return points, objects having various and arbitrary shapes, such as rocks, logs, cars, trucks, trailers, bicycle, pedestrian, guard rails, etc., may be more readily detected, where the bigger and/or closer the object to the subject vehicle the more scan points are provided.

Scan points detected by the Lidar may be used to generate a three-dimensional depth map of a FOV. According to an exemplary embodiment, the three-dimensional depth map generated by the lidar 322 may be used as a supervising sensor setup in order to train the neural network in generating a high-resolution density point cloud in response to the color and polarimetric data from the polarimetric camera 320.

In this exemplary embodiment, the processor 340 may be operative to receive the raw polarization data ($I_0$, $I_{45}$, $I_{90}$, and $I_{135}$) from each of four color quadrants of the common color filter array from the polarimetric camera 320. In addition, the processor 340 received the conventional red green and blue light information from the polarimetric camera 320. The processor 340 is then operative to transform the polarization and light information into a light and depth cloud in real time as the data is received. The processor 340 may in addition receive a sparse point could from the lidar 322 or the like in order to calibrate the depth data received from the polarimetric camera 320 and/or train the deep neural network used to generate the depth data in response to the polarimetric camera 320 data.

In an exemplary embodiment, the electromagnetic radiation from the field of view proximate to the vehicle is captured by the polarimetric camera 320 as color and polarization data for each pixel and is coupled to the processor 340. The digitized raw data output from the polarimetric camera 320 may be comprised of seven information channels where three channels are RGB color channels and four channels are polarization channels. Alternatively, one channel may be a monochrome channel. The processor 340 may then be operative to receive Lidar data, such as a ground truth point or depth image, in order to train a neural network function block. The neural network function block, performed by the processor 340 is the operative to generate a three dimensional monochrome or RGB point depth cloud in response to the received information channels. The three dimensional point depth could may then be stored on the memory for use by the vehicle controller 330 as part of an ADAS function.

In one exemplary embodiment, the processor 340 may employ a convolutional encoder-decoder to transform the images and polarization information into the depth map. For example, the encoder may be comprised of several layers, each containing convolution filters of various sizes, pooling blocks, normalization blocks, and a non-linear activation function. Each layer's output is a set of feature maps, also known as channels. The encoder receives the RGB and polarization image and generates a low dimension representation. The decoder reverses the encoder's operation and is also comprised of layers, each containing convolution, pooling, normalization, and a non-linear activation function. There may be connections between layers in the encoder and corresponding layers in the decoder. In one exemplary embodiment, the encoder-decoder architecture may resemble a U-net convolutional network for image segmentation. The network input may include three RGB channels and up to four channels of polarization data. Stacking additional channels with the 3 RGB channels is a standard procedure and requires modification of the 1st layer only. The network output includes 1 channel representing Depth. The problem may be posed as a 'Regression' problem where the 'Loss' (i.e. the difference between Predicted Depth and True Depth) may be defined in many ways such as L1 Loss, Huber Loss (Smooth L1 Loss), and L2 Loss.

The vehicle controller 330 may generate control signals for coupling to other vehicle system controllers, such as a throttle controller 355, a brake controller 360 and a steering controller 370 in order to control the operation of the vehicle in response to the ADAS algorithm. The vehicle controller may be operative to adjust the speed of the vehicle by reducing the throttle via the throttle controller 355 or to apply the friction brakes via the brake controller 360 in response to a control signals generated by the processor 340. The vehicle controller may be operative to adjust the direction of the vehicle controlling the vehicle steering via the steering controller 370 in response to a control signals generated by the processor 340.

Figure 4:
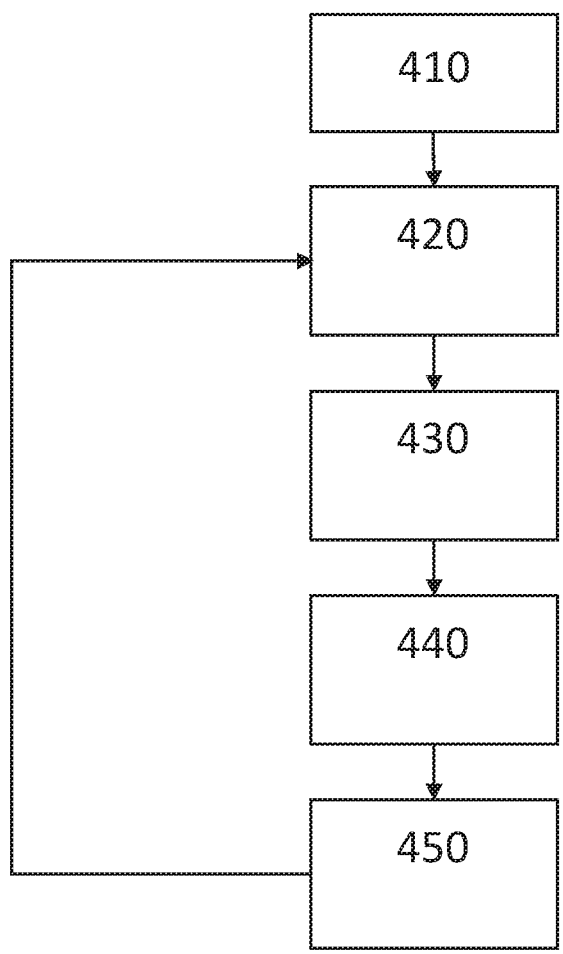
FIG. 4 shows a flow chart illustrating a method for three-dimensional point cloud generation using a polarimetric camera in a drive assistance system equipped vehicle according to an exemplary embodiment.

Turning now to FIG. 4, a flow chart illustrating an exemplary implementation of a method 300 for three-dimensional point cloud generation using a polarimetric camera in a drive assistance system equipped vehicle is shown. In this exemplary embodiment, the method is first operated to initiate 410 the driving assistance algorithm in response to a request. The requested may be generated by a user interface in response to a user input or may be generated in response to an ADAS request from another ADAS algorithm or the like. For example, the request may be generated in response to a request for an adaptive cruise control operative received via a user interface in response to a user request for activation of the ADAS algorithm. In one exemplary embodiment, the ADAS function may be generating a depth point cloud for use by a subsequent ADAS function. In this embodiment, the ADAS function may be initiated in response to operation of the ADAS equipped vehicle or the like.

The method is next operative to receive 420 polarimetric data from a polarimetric camera or the like. The polarimetric camera may be a high resolution color camera with a polarizer array layer overlaid on a color filter array or the like. Polarization data may include amplitude values for a number of different polarization angles, such as 0 degrees, 45 degrees, 90 degrees, and 135 degrees.

The method is next operative to receive 430 color data from the polarimetric camera or the like. The color data may be collected individually for each of the green, blue and red colors and coupled to the processor as individual monochromatic images or as a conventional light color information (RGB) image.

The method is next operative to perform 440 a neural network function in order to approximate a depth for each pixel in response to the polarimetric data and the color data to generate a color and depth three-dimensional point cloud. The neural network function may be trained on a number of previous color image and polarization datasets using a lidar generated depth point cloud data or stereoscopic image data as a supervising sensor setup. The method is operative to generate a color and depth three-dimensional point cloud for the field of view in response to the neural network operation.

The method is next operative to perform 450 the requested ADAS function in response to the color and depth three-dimensional point cloud.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
a camera configured to capture a color image for a field of view and a polarimetric data of the field of view wherein the polarimetric data is generated in response to a polarizer array layer, wherein the polarimetric data includes four 4×4 basic calculation units to form a 16 pixels calculation unit and wherein the polarimetric data further includes angle of linear polarization and degree of linear polarization for an image of the field of view;
a processor configured to generate a polarization plus color frame in response to the polarimetric data and the color image of the field of view and to perform a neural network function in response to the color image, the polarimetric data and the polarization plus color frame to generate a depth map of the field of view; and
a vehicle controller configured to perform an advanced driving assistance function and to control a vehicle movement in response to the depth map.

2. The apparatus of claim 1 wherein the color image includes a monochromatic green image of the field of view, a monochromatic red image of the field of view and a monochromatic blue image of the field of view.

3. The apparatus of claim 1 wherein the polarizer array layer is implemented on top of a common color filter array.

4. The apparatus of claim 1 wherein the color image includes RGB light color information.

5. The apparatus of claim 1 further including a memory configured to receive the depth map from the processor and to store the depth map.

6. A method performed by a processor comprising:
receiving a color image of a field of view from a camera;
receiving a polarimetric data of the field of view from a polarimetric camera wherein the polarimetric data is generated in response to a polarizer array layer, wherein the polarimetric data includes four 4×4 basic calculation units to form a 16 pixels calculation unit and wherein the polarimetric data further includes angle of linear polarization and degree of linear polarization for an image of the field of view;
generating a polarization plus color frame in response to the polarimetric data and the color image of the field of view and to
performing a neural network function to generate a depth map of the field of view in response to the color image, the polarization plus color frame, and the polarimetric data; and
performing a vehicle control operation to control a vehicle in response to the depth map.

7. The method of claim 6 including receiving a lidar depth cloud of the field of view from a lidar and comparing the depth map to the lidar depth cloud to reaffirm the depth map.

8. The method of claim 6 further including controlling a steering of a host vehicle in response to the vehicle control operation.

9. The method of claim 6 wherein the depth map is used by a vehicle controller to perform an assisted driving algorithm.

10. The method of claim 6 wherein the color image and the polarimetric data are captured by the camera having a common color filter array.

11. The method of claim 6 wherein the color image includes a monochromatic green image of the field of view, a monochromatic red image of the field of view and a monochromatic blue image of the field of view.

12. The method of claim 6, wherein the 16 pixels calculation unit is generated in response to a four pixel blue calculation unit, a four pixel red calculation unit and a four pixel green calculation unit and at least one polarization value for each of the four pixel blue calculation unit, the four pixel red calculation unit and the four pixel green calculation unit.

13. The method of claim 6 wherein the color image includes RGB light color information.

14. A method for performing an assisted driving operation comprising:
receiving a first polarimetric data of a first field of view wherein the first polarimetric data is generated in response to a polarizer array layer, wherein the first polarimetric data includes four 4×4 basic calculation units to form a 16 pixels calculation unit and wherein the first polarimetric data further includes angle of linear polarization and degree of linear polarization for an image of the first field of view;
receiving a first color image of the first field of view;
receiving a lidar depth point cloud of the first field of view;
generating a polarization plus color frame in response to the first polarimetric data and the first color image of the first field of view and
training a neural network function in response to the first polarimetric data, the polarization plus color frame, the first color image, and the lidar depth point cloud;
receiving a second color image of a second field of view and a second polarimetric data of the second field of view;
performing the neural network function to generate a depth map of the second field of view in response to the second color image and the second polarimetric data; and
performing the assisted driving operation in response to the depth map to control a vehicle.

15. The method for performing the assisted driving operation of claim 14 wherein the second color image and the second polarimetric data are captured by a camera having a common color filter array.

* * * * *